(12) United States Patent
Kagaya et al.

(10) Patent No.: US 8,440,749 B2
(45) Date of Patent: May 14, 2013

(54) PRIMER AND LAMINATE INCLUDING RESIN COATING FILM CONTAINING THE SAME

(75) Inventors: Hiroyuki Kagaya, Saitama (JP); Takao Honma, Kawaguchi (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/122,066

(22) PCT Filed: Sep. 24, 2009

(86) PCT No.: PCT/JP2009/066481
§ 371 (c)(1),
(2), (4) Date: Mar. 31, 2011

(87) PCT Pub. No.: WO2010/038643
PCT Pub. Date: Apr. 8, 2010

(65) Prior Publication Data
US 2011/0177345 A1    Jul. 21, 2011

(30) Foreign Application Priority Data
Oct. 1, 2008 (JP) ................................ 2008-256221

(51) Int. Cl.
- *B32B 27/06* (2006.01)
- *B32B 27/10* (2006.01)
- *B32B 15/08* (2006.01)
- *C08K 5/092* (2006.01)
- *C09D 133/14* (2006.01)
- *C09D 133/20* (2006.01)

(52) U.S. Cl.
USPC ........... 524/197; 524/196; 524/284; 524/556; 524/558; 524/560; 524/564; 524/773; 428/425.1; 428/425.8

(58) Field of Classification Search .................. 524/196, 524/197, 286, 556, 558, 560, 564, 773, 284; 428/425.1, 425.8
See application file for complete search history.

(56) References Cited

FOREIGN PATENT DOCUMENTS

| JP | 64-10118 | B2 | 6/1984 |
| JP | 63-137969 | A | 6/1988 |
| JP | 01-282271 | A | 11/1989 |

(Continued)

OTHER PUBLICATIONS

English translation of JP 01-282271.*

(Continued)

Primary Examiner — Vu A Nguyen
(74) Attorney, Agent, or Firm — Edwards Wildman Palmer LLP; James E. Armstrong, IV; Nicholas J. DiCeglie, Jr.

(57) ABSTRACT

The present invention provides a primer for a laminate for packaging having print suitability, such as excellent transfer properties of printing ink and dot reproducibility, high adhesive properties, excellent storage stability for a long period of time under highly humid conditions, and acid resistance which are obtained by improving adhesion between the base layer, a printing ink layer, a coating layer, and an adhesive layer; and a laminate containing the primer layer, and the primer containing: a main component (A) containing a copolymer containing, as a monomer, an unsaturated compound (a) having a hydroxyl group, and at least one unsaturated compound (b) selected from the group consisting of unsaturated carboxylate, styrene, unsaturated carboxylic acid, unsaturated hydrocarbon, vinyl ester, and a halogenated vinyl compound; a curing agent (B) containing a compound having an isocyanate group; and a compound (C) having 2 or more of a carboxylic acid group or 1 or more of an anhydrous carboxylic acid group.

17 Claims, 2 Drawing Sheets

```
( 2 ) Primer layer
( 1 ) Base film
```

FOREIGN PATENT DOCUMENTS

| | | |
|---|---|---|
| JP | 04-033853 A | 2/1992 |
| JP | 06-145302 A | 5/1994 |
| JP | 10-147744 A | 6/1998 |
| JP | 11-020103 A | 1/1999 |
| JP | 2002-080705 A | 3/2002 |
| JP | 2002-138246 A | 5/2002 |
| JP | 2006-116704 A | 5/2006 |
| JP | 2008-013647 A | 1/2008 |
| JP | 2008-239911 A | 10/2008 |
| WO | WO-2006/019171 A1 | 2/2006 |

OTHER PUBLICATIONS

English translation of JP Pat. 01-282271 A (Nov. 14, 1989).*
International Search Report dated Dec. 22, 2009, issued on the related PCT (PCT/JP2009/066481) with English translation thereof.
Office Action mailed Jul. 8, 2010, issued on Japanese Patent Application No. 2010-518452 with English translation thereof.

* cited by examiner

FIG. 1

| (2) Primer layer |
|---|
| (1) Base film |

FIG. 2

| (3) Print ink layer |
|---|
| (2) Primer layer |
| (1) Base film |

FIG. 3

| (5) Film |
|---|
| (4) Adhesive layer |
| (3) Print ink layer |
| (2) Primer layer |
| (1) Base film |

FIG. 4

| (5) Film |
|---|
| (4) Adhesive layer |
| (3) Print ink layer |
| (2) Primer layer |
| (6) Aluminum oxide deposition layer |
| (1) Base film |

FIG. 5

| (6) Aluminum oxide deposition layer |
| --- |
| (2) Primer layer |
| (1) Base film |

FIG. 6

| (2) Primer layer |
| --- |
| (6) Aluminum oxide deposition layer |
| (2) Primer layer |
| (1) Base film |

FIG. 7

| (3) Print ink layer |
| --- |
| (2) Primer layer |
| (6) Aluminum oxide deposition layer |
| (2) Primer layer |
| (1) Base film |

FIG. 8

| (5) Film |
| --- |
| (4) Adhesive layer |
| (3) Print ink layer |
| (2) Primer layer |
| (6) Aluminum oxide deposition layer |
| (2) Primer layer |
| (1) Base film |

PRIMER AND LAMINATE INCLUDING RESIN COATING FILM CONTAINING THE SAME

TECHNICAL FIELD

The present invention relates to a primer for a laminate which has excellent adhesive properties and heat resistance, and high definition printability, and is used in soft package fields such as food products, and medicaments; and a laminate including a coating film containing the primer.

BACKGROUND ART

Recently, various bases are printed. However, not all bases have excellent print suitability and further beautiful and high definition printing is required. At the same time, the base for a package is required to have heat resistance, retort resistance, water resistance, gas barrier properties, etc. in order to protect the contents therein.

As a method for improving the print suitability, there is a method (1) in which adhesion and transfer properties of the printing ink are improved by improving the surface of the base by a corona discharge treatment, a frame treatment, or a plasma treatment, and a method (2) in which the print suitability and adhesive properties are improved by forming a resin layer for providing high adhesive properties to the surface of the base. In order to improve the printing properties of a plastic base, the method (1) for improving the surface conditions by the corona discharge treatment, the frame treatment, or the plasma treatment is widely used, due to ease of the method (1), and popularization of the device used.

On the other hand, in the method (2), a urethane-based resin (for example, Patent Documents Nos. 1 and 2), a polyester-based resin (for example, Patent Documents Nos. 3 and 4), or an acryl polyol-based resin (for example, Patent Document No. 5), etc. is used to form a resin layer for applying the high adhesive properties. At the same time, an epoxy-based curing agent or an isocyanate-based curing agent is often used.

However, when the corona discharge treatment, or the frame treatment is used, the effects for improving the surface are decreased over time. In addition, the adhesive properties are insufficient under high humidities. Specifically, when an OPP film is subjected to the corona discharge treatment, or an ordinary frame treatment, the wettability at the surface of the film is about 50 mN/m just after the treatment. However, after six months, the wettability decreases to about 40 mN/m. Due to this, adhesive properties of the printing ink and dot reproducibility are often decreased.

In addition, as a special frame treatment, there is a method using silicic acid flame. In this method, the wettability at the surface of the base is improved to 70 mN/m or more by bonding an aminosilane with the surface of the base. The method can achieve beautiful and high definition printing. However, the treated surface has inferior rub resistance, hot water resistance, and adhesive properties under highly humid conditions. In addition, a printing ink and an adhesive used are required to have a hydrophilic group.

In the method using a urethane-based resin layer as a resin layer for providing high adhesive properties, adhesive properties are insufficient under highly humid conditions. As the method using a polyester-based resin layer as a resin layer for providing high adhesive properties, a method in which a high crystalline polyester and a low crystalline polyester are mixed or a high melting point-polyester and a low melting point-polyester are mixed is normally used. However, the former has a problem in that the adhesive properties are unstable, and resistance to hot water is insufficient.

When a urethane resin is formed on a PET film as a resin layer for providing high adhesive properties, adhesion of a urethane-based gravure ink for packages is remarkably improved. However, the adhesion of other resins, such as an acryl-based resin and the dot reproducibility are inferior.

A method in which a resin layer for providing high adhesive properties is made by combination between acryl polyol and an isocyanate-based curing agent improves adhesive properties between the base and a deposition layer by using an acryl resin (Patent Document No. 5). However, the resin layer for providing high adhesive properties may be dissolved by the printing ink containing an organic solvent, because the resin layer has insufficient solvent resistance. Due to this, printed images may be deteriorated. When the resin layer for providing high adhesive properties containing acryl polyol and an isocyanate-based curing agent is formed on a base having a high polarity, or the base having a high polarity is formed on the resin, and the laminate obtained is stored under highly humid conditions for a long period of time or immersed in water, the adhesive properties between the resin layer for providing high adhesive properties and the base may be decreased. In addition, when the adhesive interface in the laminate is wet with water in a short time, adhesive properties may be deteriorated. In particular, the adhesion is remarkably decreased under acidic conditions having pH 5 or less.

PRIOR ART DOCUMENT

Patent Document

[Patent Document No. 1] Japanese Unexamined Patent Application, First Publication No. H11-20103
[Patent Document No. 2] Japanese Unexamined Patent Application, First Publication No. 2002-80705
[Patent Document No. 3] Japanese Examined Patent Application, Second Publication No. S64-10118
[Patent Document No. 4] Japanese Unexamined Patent Application, First Publication No. H4-33853
[Patent Document No. 5] Japanese Unexamined Patent Application, First Publication No. 2006-116704

DISCLOSURE OF THE INVENTION

Problems to be Solved by the Invention

A first problem to be solved by the present invention is to provide a primer for a laminate (for packaging) having print suitability, such as excellent transfer properties of printing ink and dot reproducibility, high adhesive properties, excellent storage stability for a long period of time under highly humid conditions, and acid resistance, which are obtained by improving adhesion between the base layer, a printing ink layer, a coating layer, and an adhesive layer.

A second problem to be solved by the present invention is to provide a laminate (for packaging) including a primer layer containing the primer.

Means for Solving the Problem

As a result of intensive study, the present inventors achieved a primer having high adhesion, print suitability, excellent storage stability for a long period of time under highly humid conditions, and acid resistance by adding a compound (C) having 2 or more of a carboxylic acid group or 1 or more of an anhydrous carboxylic acid group in the molecule to a primer which contains a main component (A) containing a copolymer having a specific unsaturated compound and a curing agent (B) containing a compound having an isocyanate group.

In addition, the present inventors also found that when the primer contains unsaturated nitrile (c) as a monomer constituting the copolymer contained in the main component (A), high definition printing properties can be obtained.

In other words, first, the present invention provides a primer containing:

a main component (A) containing a copolymer containing, as a monomer, an unsaturated compound (a) having a hydroxyl group, and at least one unsaturated compound (b) selected from the group consisting of unsaturated carboxylate, styrene, unsaturated carboxylic acid, unsaturated hydrocarbon, vinyl ester, and a halogenated vinyl compound;

a curing agent (B) containing a compound having an isocyanate group; and a compound (C) having 2 or more of a carboxylic acid group or 1 or more of an anhydrous carboxylic acid group.

Secondly, the present invention provides a laminate including a resin coating layer obtained by the main component (A), the curing agent (B), and the compound (C) having 2 or more of a carboxylic acid group or 1 or more of an anhydrous carboxylic acid group, on a base layer Effects of the Present Invention The present invention can provide a laminate (for packaging) which has improved adhesion between the base layer, a printing ink layer, a coating layer, and an adhesive layer, and thereby having both print suitability, such as excellent transfer properties of printing ink and dot reproducibility, and high adhesive properties. In particular, the present invention can provide a laminate having high hot water resistance, excellent storage stability for a long period of time under highly humid conditions, and acid resistance by using a base having high hot water resistance, excellent storage stability for a long period of time under highly humid conditions, and acid resistance.

BRIEF DESCRIPTION OF THE FIGURES

FIG. 1 is a sectional view showing the laminate (structure 1) according to the present invention.

FIG. 2 is a sectional view showing the laminate (structure 2) according to the present invention.

FIG. 3 is a sectional view showing the laminate (structure 3) according to the present invention.

FIG. 4 is a sectional view showing the laminate (structure 4) according to the present invention.

FIG. 5 is a sectional view showing the laminate (structure 5) according to the present invention.

FIG. 6 is a sectional view showing the laminate (structure 6) according to the present invention.

FIG. 7 is a sectional view showing the laminate (structure 7) according to the present invention.

FIG. 8 is a sectional view showing the laminate (structure 8) according to the present invention.

BEST MODE FOR CARRYING OUT THE INVENTION

As explained above, the present invention provides a primer for a package to obtain a laminate for packaging having print suitability, such as excellent transfer properties of printing ink and dot reproducibility, and high adhesive properties, which are obtained by improving adhesion between the base layer, a printing ink layer, a coating layer, and an adhesive layer.

The primer according to the present invention contains:

a main component (A) containing a copolymer containing, as a monomer, an unsaturated compound (a) having a hydroxyl group, and at least one unsaturated compound (b) selected from the group consisting of unsaturated carboxylate, styrene, unsaturated carboxylic acid, unsaturated hydrocarbon, vinyl ester, and a halogenated vinyl compound;

a curing agent (B) containing a compound having an isocyanate group; and a compound (C) having 2 or more of a carboxylic acid group or 1 or more of an anhydrous carboxylic acid group.

It is also possible to add unsaturated nitrile (c), as a monomer, in the main component (A) containing a copolymer containing the above-mentioned specific unsaturated compounds.

The composition, which contains the main component (A) containing a copolymer containing, as a monomer, (a) an unsaturated compound having a hydroxyl group, and at least one unsaturated compound (b) selected from the group consisting of unsaturated carboxylate, styrene, unsaturated carboxylic acid, unsaturated hydrocarbon, vinyl ester, and a halogenated vinyl compound; and the curing agent (B) containing a compound having an isocyanate group, is a primer having improved adhesive properties to ink, adhesive, and various coating agents, improved print suitability, and improved ink adhesion. However, when the primer is formed on a base having a high polarity, or the base having a high polarity is formed on the primer, and the laminate obtained is stored under highly humid conditions for a long period of time or immersed in water, the adhesion between the primer and the base may be decreased. In particular, the adhesion is remarkably decreased under acidic conditions having pH 5 or less. The primer contains essentially an unsaturated compound (a) having a hydroxyl group. The larger an amount of the hydroxyl group, the lower the adhesion, because water or the acidic substance easily enters between the base and the primer.

In the present invention, a compound (C) having 2 or more of a carboxylic acid group or 1 or more of an anhydrous carboxylic acid group is further added and mixed in the composition, which contains the main component (A) containing a copolymer containing, as a monomer, an unsaturated compound (a) having a hydroxyl group, and at least one unsaturated compound (b) selected from the group consisting of unsaturated carboxylate, styrene, unsaturated carboxylic acid, unsaturated hydrocarbon, vinyl ester, and a halogenated vinyl compound; and the curing agent (B) containing a compound having an isocyanate group. Thereby, the primer for a laminate (for packaging), which has excellent storage stability for a long period of time under highly humid conditions, and acid resistance, as well as print suitability, such as excellent transfer properties of printing ink and dot reproducibility, and high adhesive properties, can be obtained. This is caused by the effects that water or the acidic substance does not readily enter between the base and the primer by coordinating locally the compound (C) having 2 or more of a carboxylic acid group or 1 or more of an anhydrous carboxylic acid group on the surface of the base. In addition, it is also possible to achieve high definition printability having excellent ink-dot reproducibility by laminating the primer containing a copolymer having unsaturated nitrile (c) as a monomer.

The primer according to the present invention is used to form a resin coating film for a laminate, which is formed on the base and can be obtained by the main component (A), the curing agent (B), and the compound (C) having 2 or more of a carboxylic acid group or 1 or more of an anhydrous carboxylic acid group. The compound (C) may be mixed with the main component (A), or the curing agent (B), in advance. In addition, it is also possible to mix the main component (A), the curing agent (B), and the compound (C) before coating.

The laminate obtained can be used in high definition printing. For example, the laminate can be widely used as various excellent packages having excellent design.

Examples of the unsaturated compound (a) having a hydroxyl group include C2-C8 hydroxyalkyl(meth)acrylates, such as β-hydroxyethyl(meth)acrylate, β-hydroxypropyl(meth)acrylate, γ-hydroxypropyl(meth)acrylate and hydroxybutyl(meth)acrylate, (meth)acrylate having a hydroxyl group such as allyl alcohol, and modified ε-caprolactone with C2-C8 hydroxyalkyl(meth)acrylate, (meth)acrylate having a polyoxyethylene chain and including a hydroxyl group at the end of the backborn chain, β-hydroxyvinyl ether, polyethylene glycol(meth)acrylate, and polypropylene glycol mono(meth)acrylate. When reactivity and the hydroxyl value are concerned, β-hydroxyethyl(meth)acrylate is preferably used. Moreover, "(meth)acrylate" means acrylate and/or methacrylate.

In addition, from the viewpoint of obtaining polymerization stability and high reactivity with an isocyanate group, β-hydroxyethyl(meth)acrylate is preferable, and β-hydroxyethyl methacrylate is most preferable.

It is preferable that the content of the unsaturated compound (a) having a hydroxyl group in the copolymer, which is converted to nonvolatile components, be in a range from 10 to 70% by mass. When the content of the unsaturated compound (a) having a hydroxyl group in the copolymer is less than 10% by mass, a sufficient crosslink structure is not readily formed, and thereby, a sufficient coating film strength and adhesion to the base may be decreased. In contrast, when it exceeds 70% by mass, it is necessary to use a large amount of the curing agent having an isocyanate group because of properties of the primer. Thereby, the surface of the primer just after coating may be sticky or the ink-dot reproducibility may decrease.

The primer according to the present invention contains essentially, as a monomer, at least one unsaturated compound (b) selected from the group consisting of unsaturated carboxylate, styrene, unsaturated carboxylic acid, unsaturated hydrocarbon, vinyl ester, and a halogenated vinyl compound, in order to obtain polymerization stability, film forming-properties and water resistance of the coating film.

Examples of the unsaturated carboxylate include methyl(meth)acrylate, ethyl(meth)acrylate, n-propyl(meth)acrylate, isopropyl(meth)acrylate, n-butyl(meth)acrylate, isobutyl(meth)acrylate, sec-butyl(meth)acrylate, tert-butyl(meth)acrylate, n-amyl(meth)acrylate, n-octyl(meth)acrylate, 2-ethylhexyl(meth)acrylate, lauryl(meth)acrylate, stearyl(meth)acrylate, 2-methoxyethyl(meth)acrylate, 2-ethoxyethyl(meth)acrylate, and 2-(n-propoxy)ethyl(meth)acrylate. Among these, when coating suitability, hot water resistance, and the glass transition point (Tg) are concerned, methyl(meth)acrylate is more preferable, and methyl methacrylate is most preferable.

Examples of the unsaturated carboxylic acid include (meth)acrylic acid, crotonic acid, cinnamic acid, itaconic acid, itaconic anhydride, maleic acid, maleic anhydride, fumaric acid, citraconic acid, and mesaconic acid.

Examples of the unsaturated hydrocarbon include ethylene, propylene, isobutylene, 1-butene, and 1-pentene.

Examples of the vinyl ester include vinyl formate, vinyl acetate, vinyl propionate, vinyl butyrate, vinyl pivalate, vinyl versatate, and vinyl stearate.

Examples of the halogenated vinyl compound include vinyl chloride, vinylidene chloride, and vinyl fluoride.

Among these, methyl(meth)acrylate is more preferable, and methyl methacrylate is most preferable.

It is preferable that the content of the unsaturated compound (b) selected from the group consisting of unsaturated carboxylate, styrene, unsaturated carboxylic acid, unsaturated hydrocarbon, vinyl ester, and a halogenated vinyl compound in the copolymer, which is converted in a nonvolatile component, be in a range from 20 to 55% by mass. When the content of the unsaturated compound (b) in the copolymer is less than 20% by mass, the relative amount of the unsaturated nitrile (c) and the unsaturated compound (a) having a hydroxyl group is larger, and solubility in a solvent tends to decrease. In contrast, when it exceeds 55% by mass, the relative amount of the unsaturated nitrile (c) and the unsaturated compound (a) having a hydroxyl group is smaller, crosslinking structure is insufficient. Due to this, the ink-dot reproducibility tends to decrease, together with insufficiency of coating film strength and hot water resistance.

When the unsaturated compound (b) contains acrylic acid or methacrylic acid as the unsaturated carboxylic acid, the content of acrylic acid or methacrylic acid in the copolymer, which is converted in nonvolatile components, is preferably in a range from 0.05 to 3% by mass.

When the unsaturated compound (b) contains styrene, the content of styrene in the copolymer, which is converted in nonvolatile components, is preferably in a range from 0.01 to 30% by mass, and more preferably in a range from 0.05 to 10% by mass.

When the unsaturated compound (b) contains butyl(meth)acrylate as the unsaturated carboxylate, the content of butyl(meth)acrylate in the copolymer, which is converted in nonvolatile components, is preferably in a range from 0.01 to 30% by mass.

The main component (A) constituting the primer according to the present invention contains the copolymer containing, as a monomer, the unsaturated compound (a) having a hydroxyl group, and at least one unsaturated compound (b) selected from the group consisting of unsaturated carboxylate, styrene, unsaturated carboxylic acid, unsaturated hydrocarbon, vinyl ester, and a halogenated vinyl compound. It is also possible to add the unsaturated nitrile (c) as a monomer in the main component (A) containing the copolymer containing the abovementioned unsaturated compound.

Examples of the unsaturated nitrile (c) include (meth)acrylonitrile, α-chloroacryonitrile, α-chloromethyl acrylonitrile, α-methoxyacrylonitrile, and α-ethoxyacrylonitrile. When reactivity is concerned, (meth)acrylonitrile is preferable.

The content of the unsaturated nitrile (c) in the copolymer is preferably in a range from 0 to 50% by mass, and more preferably in a range from 10 to 50% by mass. When the content of the unsaturated nitrile (c) in the copolymer exceeds 50% by mass, the solubility of the copolymer in an organic solvent decreases, and this tends to prevent an increase of molecules during polymerization. Due to this, coating is not readily obtained. As a result, transparency of the primer is inferior, smoothness is insufficient, and the ink-dot reproducibility tends to be decreased. When the content of the unsaturated nitrile (c) in the copolymer is 10% by mass or more, the ink-dot reproducibility remarkably increases.

The unsaturated nitrile (c) makes a crosslinking structure with the curing agent (B) to improve the coating film strength and hot water resistance. Therefore, the copolymer in the main component (A) is required to have a hydroxyl group. In order to achieve this, the unsaturated compound (a) having a hydroxyl group is used.

Examples of the solvent used in the main component (A) in the primer according to the present invention include toluene, methyl ethyl ketone (MEK), cyclohexanone, SolvesSo®, isophorone, xylene, methyl isobutyl ketone (MIBK), ethyl acetate, butyl acetate, n-propyl alcohol, isopropyl alcohol, ethyl alcohol, methanol, propylene glycol, ethylene glycol, propylene glycol monomethyl ether, and propylene glycol methyl ether acetate. The solvent used is not limited to these solvents.

The primer according to the present invention is primer for a laminate (for packaging) having both long-term storage stability under highly humid conditions, and acid resistance as well as adhesion, and print suitability by forming a crosslinked coating film by the reaction between the main component (A) and the curing agent (B), and adding the compound (C) having 2 or more of a carboxylic acid group or 1 or more of an anhydrous carboxylic acid group in the molecule to the coating film.

Examples of the curing agent (B) include compounds having an isocyanate group, which reacts with the hydroxyl group in a side chain of the copolymer contained in the main component (A).

Examples of the compound having an isocyanate group include aromatic diisocyanates, such as 2,4-tolylene diisocyanate, 2,6-tolylene diisocyanate, 4,4'-diphenyl methane diisocyanate, 2,4'-diphenyl methane diisocyanate, 2,2'-diphenyl methane diisocyanate, 1,5-naphthylene diisocyanate, 1,4-naphthylene diisocyanate, p-phenylene diisocyanate, m-phenylene diisocyanate, o-xylylene diisocyanate, m-xylylene diisocyanate, p-xylylene diisocyanate, tetramethyl xylylene diisocyanate, 4,4'-diphenyl ether diisocyanate, 2-nitrodiphenyl 4,4'-diisocyanate, 2,2'-diphenyl propane-4,4'-diisocyanate, 3,3'-dimethyl diphenyl methane-4,4'-diisocyanate, 4,4'-diphenyl propane diisocyanate, and 3,3'-dimethoxydiphenyl-4,4'-diisocyanate;

aliphatic diisocyanates, such as tetramethylene diisocyanate, hexamethylene diisocyanate, 2-methyl-1,5-pentane diisocyanate, 3-methyl-1,5-pentane diisocyanate, lysine diisocyanate, and 2,2,4-trimethyl hexamethylene diisocyanate;

alicycle diisocyanates, such as isophorone diisocyanate, hydrogenated tolylene diisocyanate, hydrogenated diphenyl methane diisocyanate, hydrogenated xylylene diisocyanate, hydrogenated tetramethyl xylylene diisocyanate, and cyclohexyl diisocyanate;

urethant-modified products, allophanate-modified products, urea-modified products, biuret-modified products, urethodione-modified products, urethoimine-modified products, isocyanurate-modified products, and carbodiimide-modified products of these organic isocyanates. These isocyanate compounds may be used alone or in combination.

In order to obtain excellent hot water resistance, aromatic isocyanates of which an isocyanate group is not directly bonded to the aromatic ring, such as o-xylylene diisocyanate, m-xylylene diisocyanate, p-xylylene diisocyanate, and tetramethyl xylylene diisocyanate; aliphatic diisocyanates such as tetramethylene diisocyanate, hexamethylene diisocyanate, 2-methyl-1,5-pentane diisocyanate, 3-methyl-1,5-pentane diisocyanate, lysine diisocyanate, and 2,2,4-trimethyl hexamethylene diisocyanate; and alicyclic diisocyanates, such as isophorone diisocyanate, hydrogenated tolylene diisocyanate, hydrogenated diphenyl methane diisocyanate, hydrogenated xylylene diisocyanate, hydrogenated tetramethyl xylylene diisocyanate, and cyclohexyl diisocyanate are preferably used among these isocyanate compounds.

Examples of the solvent used in the curing agent (B) include toluene, methyl ethyl ketone (MEK), cyclohexanone, SolvesSo®, isophorone, xylene, methyl isobutyl ketone (MIBK), ethyl acetate, butyl acetate, propylene glycol monomethyl ether, and propylene glycol methyl ether acetate. The solvent used is not limited to these solvents.

The main component (A), the curing agent (B), and the compound (C) are mixed when coating the base. The mixing ratio between the main component (A) and the curing agent (B) is preferably adjusted so that the amount of the NCO group in the curing agent (B) exceeds the amount of the hydroxyl group in the main component (A). That is, the mixing ratio of the curing agent (B) to the main component (A) is preferably about 50% to about 200%. The compound (C) may be mixed in the main component (A) or the curing agent (B) in advance. In addition, the main component (A), the curing agent (B), and the compound (C) may be mixed before coating.

In the present invention, in order to maintain adhesion or improve the adhesion, the compound (C) having 2 or more of a carboxylic acid group or 1 or more of an anhydrous carboxylic acid group in the molecule is used essentially.

Examples of the compound (C) having 2 or more of a carboxylic acid group or 1 or more of an anhydrous carboxylic acid group in the molecule include phthalic acid, terephthalic acid, isophthalic acid, sebacic acid, azelaic acid, adipic acid, trimellitic acid, 2,6-naphthalene dicarboxylic acid, meleic acid, succinic acid, malic acid, citric acid, isocitric acid, and tartaric acid.

Examples of the compound having 1 or more of an acid anhydride include maleic anhydride, succinic anhydride, trimellitic anhydride, and tetrabasic acid anhydrides. When the primer is coated on a base having a high polarity, such as a metal base, in particular, compounds having two or more of anhydric acids such as tetrabasic acid anhydrides are preferably used. Examples of the tetrabasic acid anhydride include benzophenone tetracarboxylic anhydride, 2,3,6,7-naphthalene tetracarboxylic dianhydride, and 5-(2,5-dioxotetrahydro-3-furanyl)-3-methyl-3-cyclohexene-1,2-dicarboxylic anhydride. In addition, a polymer containing the compound (C) having 2 or more of a carboxylic acid group or 1 or more of an anhydrous carboxylic acid group in the molecule can also be used.

The number average molecular weight of the compound (C) having 2 or more of a carboxylic acid group or 1 or more of an anhydrous carboxylic acid group in the molecule is preferably 1,000 or less.

The content of the compound (C) having 2 or more of a carboxylic acid group or 1 or more of an anhydrous carboxylic acid group in the molecule in the primer, which is converted in nonvolatile components, is preferably in a range from 5 to 50% by mass.

The primer according to the present invention can contain a well-known curing accelerator, bulking agent, softener, antiaging agent, stabilizer, adhesion accelerator, leveling agent, defoaming agent, plasticizer, inorganic filler, organic filler, resin for providing adhesive properties, fiber, pigment, dye, and extender for operating life, etc. in addition to the abovementioned components.

It is also possible to use various well-known coupling agents, epoxy resin, etc. as the adhesion accelerator. In particular, in order to improve adhesion to the surface of the base, silane-based coupling agents, titanium-based coupling agents, aluminum-based coupling agents, zirconium-based coupling agents, etc. can also be used. Any silane-based coupling agents, titanium-based coupling agents, aluminum-based coupling agents, zirconium-based coupling agents can be used.

Examples of the silane-based coupling agent include vinyl trichlorosilane, hydrochloride of vinyl trimethoxysilane, vinyl triethoxysilane, 2-(3,4-epoxycyclohexyl) ethyl trimethoxysilane, 3-glycidoxypropyl trimethoxysilane, 3-glycidoxy propyl methyl diethoxysilane, 3-glycidoxypropyl triethoxysilane, p-styryl trimethoxysilane, 3-methacryloxypropyl methyl dimethoxysilane, 3-methacryloxy propyl trimethoxysilane, 3-methacryloxy propyl methyl diethoxysilane, 3-methacryloxypropyl triethoxysilane, 3-acryloxypropyl trimethoxysilane, N-(2-aminoethyl)-3-aminopropyl methyl dimethoxysilane, N-(2-aminoethyl)-3-aminopropyl trimethoxysilane, N-(2-aminoethyl)-3-aminopropyl triethoxysilane, 3-aminopropyl trimethoxysilane, 3-aminopropyl triethoxysilane, 3-triethoxysilyl-N-(1,3-dimethyl-butylidene) propylamine, N-phenyl-3-aminopropyl trimethoxysilane, and N-(vinyl benzyl)-2-aminoethyl-3-aminopropyl trimethoxysilane, 3-ureidopropyl triethoxysilane, 3-chloropropyl trimethoxysilane, 3-mercaptopropyl methyl dimethoxysilane, 3-mercaptopropyl trimethoxysilane, bis (triethoxysilyl propyl)tetrasulfide, 3-isocyanatepropyl triethoxysilane, tetramethoxysilane, methyl trimethoxysilane, dimethyl dimethoxysilane, phenyl trimethoxysilane, diphenyl dimethoxysilane, tetraethoxysilane, methyl triethoxysilane, dimethyl diethoxysilane, phenyl triethoxysilane, diphenyl diethoxysilane, hexyl trimethoxysilane, hexyl triethoxysilane, decyl trimethoxysilane, decyl triethoxysilane, trifluoropropyl trimethoxysilane, and hexamethyl disilazane.

Examples of the titanium-based coupling agent include titanium acetylacetonate, titanium octyl glycolate, titanium tetraacetyl acetonate, titanium ethyl acetoacetate, titanium acylate (acyloxytitanate), polyhydroxytitanium stearate, titanium lactate, titanium triethanol aminate, tetraisopropyl titanate, tetranormalbutyl titanate, butyl titanate dimer, and tetraoctyl titanate.

Examples of the aluminum-based coupling agent include aluminum alcoholates, such as aluminum isopropylate, mono sec-butoxyaluminum diisopropylate, aluminum sec-butyrate, and aluminum ethylate;

alkyl acetate aluminum diisopropylates, such as ethyl acetoacetate aluminum diisopropyl; and aluminum tris(ethyl acetoacetate), aluminum monoacetyl acetonate bis(ethyl acetoacetate), aluminum tris(acetyl acetonate), aluminum mono-isopropoxy monooleoxyethyl acetoacetate, and diisopropoxy aluminum lauryl acetoacetate.

Examples of the zirconium-based coupling agent include zirconium tetraacetyl acetonate, zirconium tributoxyacetyl acetonate, zirconium tributoxystearate, tetra-normal-propoxyzirconium, and tetra-normal-butoxyzirconium.

These coupling agents can be used alone or in combination based on the kind of the base.

As the epoxy resin, oligomers can also be used. Example of the epoxy resin include epoxy resin obtained by the condensation reaction between epichlorohydrin and various phenol compounds, such as bisphenol A, bisphenol S, novolac, o-cresol novolac, and p-alkyl phenol novolac.

The primer according to the present invention is basically evaluated as a laminate which is obtained by coating the primer on various base. The adhesive properties of the primer to the base, printing suitability such as adhesion of ink printed on a coated film made of the primer after curing, dot reproducibility, ink transfer properties are evaluated. In addition, strength of a laminate which is produced by attaching the primer on a first base film to a second base film using an adhesive, and heat resistance of the laminate after retort are also evaluated. For example, the following laminates are produced for evaluation.

Laminate Structure 1

A laminate which is obtained by coating the primer on a base film (1), such as a polyethylene terephthalate film (abbreviated as "PET film" below) by various coating methods, and drying the primer to be cured, and thereby, a primer layer (2) is produced on the base film (1). The laminate 1 is shown in FIG. 1.

Laminate Structure 2

A laminate which is obtained by printing ink, such as gravure ink, on the primer layer (2) in the laminate 1, and thereby producing a print ink layer (3) on the primer layer (2). The laminate 2 is shown in FIG. 2.

Laminate Structure 3

A laminate which is obtained by laminating a film (5), such as an unstretched polypropylene film (abbreviated as "PP film" below), on the print ink layer (3) in the laminate 2 (which is obtained by printing ink, such as gravure ink, on the primer layer (2) in the laminate 1), via an adhesive layer (4). The laminate 3 is shown in FIG. 3.

Laminate Structure 4

A laminate which is obtained by coating the primer on an aluminum oxide deposition layer (6) on the base film (1), such as a PET film by various coating methods, and drying the primer to be cured, and thereby, a primer layer (2) is produced on the aluminum oxide deposition layer (6); forming the print ink layer (3) using printing ink, such as gravure ink on the primer layer (2); and laminating the film (5), such as an unstretched PP film, on the print ink layer (3) via the adhesive layer (4). The laminate 4 is shown in FIG. 4.

Laminate Structure 5

A laminate which is obtained by forming an aluminum oxide deposition layer (6) having a thickness of 50 nm on the primer layer (2) in the laminate 1 (which is obtained by coating the primer on a base film (1), such as a PET film, by various coating methods to produce the primer layer (2)) by an evaporation method using an oxidation reaction. The laminate 5 is shown in FIG. 5.

Laminate Structure 6

A laminate which is obtained by coating the primer by various coating methods to produce the primer layer (2) on the surface of the deposition layer (6) of the laminate 5 (which is obtained by forming an aluminum oxide deposition layer (6) having a thickness of 50 nm on the surface of the laminate 1 by an evaporation method using an oxidation reaction, which is obtained by coating the primer on a base film (1), such as a PET film, by various coating methods to produce the primer layer (2)). The laminate 6 is shown in FIG. 6.

Laminate Structure 7

A laminate which is obtained by forming the print ink layer (3) using printing ink, such as gravure ink, on the primer layer (2) in the laminate 6 [which is obtained by coating the primer by various coating methods to produce the primer layer (2) on the deposition surface of the laminate 5 (which is obtained by forming an aluminum oxide deposition layer (6) having a thickness of 50 nm on the surface of the laminate 1 by an evaporation method using an oxidation reaction, which is obtained by coating the primer on a base film (1), such as a PET film, by various coating methods to produce the primer layer (2))]. The laminate 7 is shown in FIG. 7.

Laminate Structure 8

A laminate which is obtained by laminating a film (5), such as an unstretched polypropylene film, via an adhesive layer (4), on the print ink layer (3) in the laminate 7 [which is obtained by forming the print ink layer (3) using printing ink, such as gravure ink on the primer layer (2) in the laminate 6, which is obtained by coating the primer by various coating methods to produce the primer layer (2) on the deposition surface of the laminate 5 (which is obtained by forming an aluminum oxide deposition layer (6) having a thickness of 50 nm on the surface of the laminate 1 by an evaporation method using an oxidation reaction, which is obtained by coating the primer on a base film (1), such as a PET film, by various coating methods, to produce the primer layer (2))]. The laminate 8 is shown in FIG. 8.

Examples of the base film include a PET film which is subjected to corona treatment, a deposit aluminum oxide PET film, a deposit silica PEF film, and a polyactic acid-based biodegradable film.

As the film (5) for sealant in the laminates, an unstretched PP film is mainly used.

In order to coat the primer on the base film or various layers, a gravure coater, a gravure reverse coater, a micro gravure coater, a flexo coater, a blanket coater, a lip coater, a spin coater, a slot die coater, a roll coater, a knife coater, an air knife coater, a kiss touch coater, a comma coater, etc. can be used. When a gravure coater, a gravure reverse coater, or a micro gravure coater is used, a uniform continuous thin film can be produced.

The thickness of the coated film is in a range from about 0.1 to 10 g/m² (dry), and preferably in a range from 0.3 to 3 g/m² (dry).

EXAMPLES

The present invention is explained in detail referring to Examples and Comparative Examples.

Preparation of Primer

Examples 1 to 7 and Comparative Examples 1 to 7

The main component solution (A), of which the monomer composition is shown in Table 1, was prepared. The solvent used contains MEK, ethyl acetate, and propylene glycol monomethyl ether at 70:14:16 in volume. The content of nonvolatile components in the solvent was adjusted to 10% by volume.

In addition, the primer 1 to 7 (Examples 1 to 7) and the comparative primer 1 to 7 (Comparative Examples 1 to 7) were prepared adding the curing agent (B) and the compound (C) having 2 or more of a carboxylic acid group or 1 or more of an anhydrous carboxylic acid group in the molecule in the main component solution (A) so as to have the composition shown in Table 1.

TABLE 1

|  | Main component solution (A) | | | | | Compound (C) | | Curing agent (B) | |
| --- | --- | --- | --- | --- | --- | --- | --- | --- | --- |
|  | MMA | AN | β-HEMA | St | BA | MMA | DFMCDA | XDI-TMP | IPDI-TMP |
| Comparative Primer 1 | 20 | 10 | 70 | 0.05 | 0.05 |  |  | 100 |  |
| Comparative Primer 2 | 45 | 35 | 20 | 0.05 | 0.05 |  |  | 50 |  |
| Comparative Primer 3 | 50 | 20 | 30 | 0.05 | 0.05 |  |  | 50 |  |
| Comparative Primer 4 | 40 | 49 | 10 | 0.05 | 0.05 | 1.00 |  | 50 |  |
| Comparative Primer 5 | 30 | 20 | 50 | 0.05 | 0.05 |  |  | 50 | 50 |
| Comparative Primer 6 | 30 | — | 70 | 0.05 | 0.05 |  |  | 100 |  |
| Comparative Primer 7 | 80 | — | 20 | 0.05 | 0.05 |  |  | 50 |  |
| Example Primer 1 | 20 | 10 | 70 | 0.05 | 0.05 |  | 90 | 100 |  |
| Example Primer 2 | 45 | 35 | 20 | 0.05 | 0.05 |  | 10 | 50 |  |
| Example Primer 3 | 50 | 20 | 30 | 0.05 | 0.05 |  | 10 | 50 |  |
| Example Primer 4 | 40 | 49 | 10 | 0.05 | 0.05 | 1.00 | 10 | 50 |  |
| Example Primer 5 | 30 | 20 | 50 | 0.05 | 0.05 |  | 20 | 50 | 50 |
| Example Primer 6 | 30 | — | 70 | 0.05 | 0.05 |  | 20 | 100 |  |
| Example Primer 7 | 80 | — | 20 | 0.05 | 0.05 |  | 20 | 50 |  |

In Table 1, the abbreviations denote:
MMA: methyl methacrylate
AN: acrylonitrile
β-HEMA: β-hydroxyethyl methacrylate ("β" is abbreviated in Table 1)
ST: styrene
BA: butyl acrylate
BMA: butyl methacrylate
MAA: methacrylic acid
XDI: xylene diisocyanate
IPDI: isophorone diisocyanate
TMP: trimethylol propane
XDI-TMP: adduct of XDI-TMP
IPDI-TMP: adduct of IPDI-TMP
DFMCDA: 5-(2,5-dioxotetrahydro-3-furanyl)-3-methyl-3-cyclohexene-1,2-dicarboxylic anhydride
VMCH: vinyl chloride-vinyl acetate-maleic acid terpolymer resin, marketed by Dow Chemical Company
353S: Auroren ® 353S, acrylic modified α-olefin resin, marketed by Nippon Paper Chemicals Co., Ltd.

Preparation of Laminate

Examples 1 to 14

The laminate in Examples 1 to 7, which has the same structure as that of the laminate Structure 1, was produced by coating the Example Primer 1 to 7 containing the components (A), (B), and (C), of which the composition is shown in Table 1, on a deposit aluminum oxide PET film having a thickness of 12 μm ("BARRIALOX®-VM-PET1011(HG)") marketed by Toray Advanced Film Co., Ltd.) as the base film by a direct gravure method so that the coated amount after drying be 1.0 g/m².

Similarly, the laminate in Examples 8 to 14, which has the same structure as that of the laminate Structure 1, was produced in a manner identical to the manner explained above, except that an aluminum foil having a thickness of 30 μm (soft aluminum, marketed by Toyo Aluminum K.K.) was used as the base film.

Preparation of Laminate

Comparative Examples 1 to 14

The laminate in Comparative Examples 1 to 7, which has the same structure as that of the laminate Structure 1, was produced by coating the Comparative Example Primer 1 to 7 containing the components (A) and (B), of which the composition is shown in Table 1, on a deposit aluminum oxide PET film having a thickness of 12 μm ("BARRIALOX®-VM-PET1011(HG)" marketed by Toray Advanced Film Co., Ltd.) as the base film by a direct gravure method so that the coated amount after drying be 1.0 g/m², and aging the obtained laminate at 40° C. for 48 hours to be cured.

Similarly, the laminate in Comparative Examples 8 to 14, which has the same structure as that of the laminate Structure 1, was produced in a manner identical to the manner explained above, except that an aluminum foil having a thickness of 30 μm (soft aluminum, marketed by Toyo Aluminum K.K.) was used as the base film.

The Example laminate 1 to 7 and the Comparative laminate 1 to 7 were evaluated as shown below. The results are shown in Table 2.

Evaluation Item and Evaluation Method (1: Transmission)

The transmittance of the laminates produced was measured in the accordance with ASTM D 1003, using a haze/transmittance measurement device (Haze-guard II; marketed by Toyo Seiki Seisaku-sho Ltd.).

(2: Haze)

The haze of the laminates produced was measured in the accordance with ASTM D 1003, using a haze/transmittance measurement device (Haze-guard II; marketed by Toyo Seiki Seisaku-sho Ltd.).

(3: Adhesion of Primer)

After coating the primer on the base film, a cellophane adhesive tape having a width of 15 mm marketed by Nichiban Co., Ltd. was adhered to the surface to be printed of the primer layer.

Evaluation Standards

Excellent: Ink is never peeled
Good Ink is slightly peeled
Inferior Less than 20% of Ink was peeled
Poor 20% or more of Ink was peeled

TABLE 2

| Base film | Laminate Structure 1 Deposit Alumina PET | | |
|---|---|---|---|
| Evaluation Item | Transmission | Haze | Primer Adhesion |
| Comparative Example 1 | 91.2 | 1.7 | Excellent |
| Comparative Example 2 | 91.2 | 1.7 | Excellent |
| Comparative Example 3 | 91.2 | 1.7 | Excellent |
| Comparative Example 4 | 90 | 6.8 | Excellent |
| Comparative Example 5 | 91.4 | 1.6 | Excellent |
| Comparative Example 6 | 91.1 | 1.7 | Excellent |
| Comparative Example 7 | 91.2 | 1.9 | Excellent |
| Example 1 | 91.2 | 1.7 | Excellent |
| Example 2 | 91.3 | 1.7 | Excellent |
| Example 3 | 91.2 | 1.8 | Excellent |
| Example 4 | 88 | 7.3 | Excellent |
| Example 5 | 91.1 | 1.8 | Excellent |
| Example 6 | 91.1 | 1.7 | Excellent |
| Example 7 | 91.4 | 1.7 | Excellent |

In the laminate obtained in Examples 8 to 14 and Comparative Examples 8 to 14, only adhesive properties of the primer were evaluated. The results are shown in Table 3.

TABLE 3

| Base film Evaluation Item | Laminate Structure 1 Aluminum foil Primer Adhesion |
|---|---|
| Comparative Example 8 | Excellent |
| Comparative Example 9 | Excellent |
| Comparative Example 10 | Excellent |
| Comparative Example 11 | Good |
| Comparative Example 12 | Excellent |
| Comparative Example 13 | Excellent |
| Comparative Example 14 | Excellent |
| Example 8 | Excellent |
| Example 9 | Excellent |
| Example 10 | Excellent |
| Example 11 | Good |
| Example 12 | Excellent |
| Example 13 | Excellent |
| Example 14 | Excellent |

Preparation of Laminate

Examples 15 to 28

The laminate having the same structure as that of the laminate Structure 2 was produced by printing gravure ink (Univure A; 407 middle chrome yellow, 105 red, 507 primary indigo, 805 black (sumi), 793 white; marketed by DIC Corporation) on the surface of the primer layer, which had been dried and cured, in the laminate of the Examples 1 to 14. Moreover, when printing, 3 parts of CVL curing agent #10 was added in 100 parts of Univure A, which is gravure ink marketed by DIC Corporation. Then, after coating the gravure ink, the obtained print ink layer was subjected to aging to be cured at 40° C. for 48 hours.

Similarly to Examples 15 to 28, the laminate including no primer layer in Comparative Example 43 was produced by printing the gravure ink to form the print ink layer on the treated surface of the PET film (PET film having one surface treated with corona; ESTER® film E5100; marketed by TYOBO. CO., LTD.).

Similarly to Examples 15 to 28, the laminate including no primer layer in Comparative Example 44 was produced by printing the gravure ink to form the print ink layer on the non-treated surface of the PET film (PET film having one surface treated with corona; ESTER® film E5100; marketed by TYOBO. CO., LTD.).

Similarly to Examples 15 to 28, the laminate including no primer layer in Comparative Example 45 was produced by printing the gravure ink to form the print ink layer on the deposit surface of the deposit aluminum oxide PET film (BARRIALOX® VM-PET1011 (HG), marketed by Toray Advanced Film Co., Ltd.)

The Example laminate 15 to 28, the Comparative laminate 15 to 28, and the Comparative laminate 43 to 45 were evaluated as shown below. The results are shown in Tables 4 and 5.

(4: Ink Dot Reproducibility)

Gravure ink containing a solvent was printed on the primer layer in the laminate with a printing speed of 40 m/min. When printing, a plate for solid printing was used. Moreover, the evaluation was carried out by magnifying the surface of the primer layer 400 times using a microscope (VH-8000, marketed by Keyence Corporation), and observing with eyes.

Evaluation Standards

Excellent: No shedding and no-printed spots were observed
Good No shedding but slight no-printed spots in 20% cells were observed
Inferior No shedding but many no-printed spots in 20% cells were observed
Poor Much shedding and many no-printed spots in 20% cells were observed (5: Ink Transfer Properties (Gradation Transfer Properties))

Gravure ink containing a solvent was printed on the primer layer in the laminate with a printing speed of 40 m/min. When printing, a plate for gradation printing, and a plate for solid printing were used. Then, existence or non-existence of tone jump, and highlight, and transfer of the solid portion were observed with the naked eye.

Evaluation Standards

Excellent: No tone jump was observed
Good Tone jump was observed in 40% cells
Inferior Tone jump was observed in 60% cells
Poor Tone jump was observed in 80% cells (6: Ink Adhesion)

After printing the ink, a cellophane adhesive tape having a width of 15 mm marketed by Nichiban Co., Ltd. was adhered to the surface of the print ink layer, and peeled.

Evaluation Standards

Excellent: Ink is never peeled
Good Ink is slightly peeled.
Inferior Less than 20% of ink was peeled
Poor 20% or more of ink was peeled

TABLE 4

| Base film | Laminate Structure 2 Deposit Alumina PET | | |
|---|---|---|---|
| Evaluation Item | Ink Reproducibility | Ink Transfer Properties | Ink Adhesion |
| Comparative Example 15 | Good | Excellent | Excellent |
| Comparative Example 16 | Excellent | Excellent | Excellent |
| Comparative Example 17 | Excellent | Excellent | Excellent |
| Comparative Example 18 | Excellent | Inferior | Excellent |
| Comparative Example 19 | Excellent | Excellent | Excellent |

TABLE 4-continued

| Base film | Laminate Structure 2 Deposit Alumina PET | | |
|---|---|---|---|
| Evaluation Item | Ink Reproducibility | Ink Transfer Properties | Ink Adhesion |
| Comparative Example 20 | Good | Excellent | Excellent |
| Comparative Example 21 | Good | Excellent | Excellent |
| Example 15 | Good | Excellent | Excellent |
| Example 16 | Excellent | Excellent | Excellent |
| Example 17 | Excellent | Excellent | Excellent |
| Example 18 | Excellent | Inferior | Excellent |
| Example 19 | Excellent | Excellent | Excellent |
| Example 20 | Good | Excellent | Excellent |
| Example 21 | Good | Excellent | Excellent |
| Comparative Example 43 | Good | Excellent | Excellent |
| Comparative Example 44 | Poor | Inferior | Inferior |
| Comparative Example 45 | Inferior | Good | Excellent |

TABLE 5

| Base film | Laminate Structure 2 Alumina foil | | |
|---|---|---|---|
| Evaluation Item | Ink Reproducibility | Ink Transfer Properties | Ink Adhesion |
| Comparative Example 22 | Good | Excellent | Excellent |
| Comparative Example 23 | Excellent | Excellent | Excellent |
| Comparative Example 24 | Excellent | Excellent | Excellent |
| Comparative Example 25 | Excellent | Inferior | Excellent |
| Comparative Example 26 | Excellent | Excellent | Excellent |
| Comparative Example 27 | Good | Excellent | Excellent |
| Comparative Example 28 | Good | Excellent | Excellent |
| Example 22 | Good | Excellent | Excellent |
| Example 23 | Excellent | Excellent | Excellent |
| Example 24 | Excellent | Excellent | Excellent |
| Example 25 | Excellent | Inferior | Excellent |
| Example 26 | Excellent | Excellent | Excellent |
| Example 27 | Good | Excellent | Excellent |
| Example 28 | Good | Excellent | Excellent |
| Comparative Example 43 | Good | Excellent | Excellent |
| Comparative Example 44 | Poor | Inferior | Inferior |
| Comparative Example 45 | Inferior | Good | Excellent |

Preparation of Laminate

Examples 29 to 42 and Comparative Examples 29 to 42

The laminate having the same structure as that of the laminate Structure 3 was produced by adhering the unstretched PP film (ZK-93KM, marketed by Toray Advanced Film Co., Ltd.) to the print ink layer of the laminate in Examples 15 to 28 using an adhesive (DICDRY® LX-963, marketed by DIC Corporation). Thereby, Example Laminates 29 to 42 were produced.

The laminate having the same structure as that of the laminate Structure 3 was produced by adhering the unstretched PP film (ZK-93KM, marketed by Toray Advanced Film Co., Ltd.) to the print ink layer of the laminate in Comparative Examples 15 to 28 using an adhesive (DICDRY® LX-963, marketed by DIC Corporation). Thereby, Comparative Laminates 29 to 42 were produced.

Moreover, the adhesive used is an adhesive for dry-laminate, and the composition of the adhesive used is shown below.

DICDRY® LX-963:DICDRY® LX-963/KO-40=8/1

The adhesion of the adhesive and laminate strength of the laminate in Examples 29 to 42 and Comparative Examples 29 to 42 were evaluated.

Moreover, in the laminate in Examples 29 to 35 and Comparative Examples 29 to 35, the laminate strength of the laminate, which had been obtained just after storing the laminate at 40° C. at 90% humidity for 14 days.

In the laminate in Examples 36 to 42 and Comparative Examples 36 to 42, the laminate strength of the laminate was evaluated after a retort test by pouring cereal vinegar (marketed by Mizkan Group Corporation) for 1 day. The results are shown in Tables 6 and 7.

(7: Adhesion of Adhesive)

When measuring the laminate strength, the peeled surfaces at the interface between the unstretched PP film and the adhesive layer were observed using an IR spectrometer.

Evaluation Standards

Excellent: No peeling was observed at the interface
Good Slight peeling was observed at the interface
Inferior Peeling was observed at less than 20% of the interface
Poor Peeling was observed 20% or more of the interface (8: Laminate Strength)

After producing the laminate having the laminate structure 3, the laminate was cured at 40° C. for 72 hours, and then the laminate strength was measured by carrying out 180° Peeling Test with a peeling speed of 200 mm/min, in accordance with JIS K6854.

(9: Laminate Strength After Retort Test)

After producing the laminate having the laminate structure 3, the laminate was cured at 42° C. for 72 hours. Then, a pouch having a height of 290 mm and width of 210 mm was produced using the cured laminate. After that water, or cereal vinegar (marketed by Mizkan Group Corporation) was filled in the pouch, and was subjected to a retort test at 121° C. for 30 minutes. After sufficiently cooling, the laminate strength was measured in accordance with JIS K6854, 180° Peel Test with a peeling speed of 200 mm/min.

(10: Laminate Strength After Storage for 14 Days)

After producing the laminate having the laminate structure 3, the laminate was cured at 40° C. for 72 hours. Then, the laminate was stored at 40° C., 90% humidity for 14 days. Then, the laminate strength of the laminate was measured in accordance with JIS K6854, 180° Peel Test with a peeling speed of 200 mm/min.

TABLE 6

| Base film | Laminate Structure 3 Deposit Alumina PET | | |
|---|---|---|---|
| Evaluation Item | Adhesion of Adhesive | Laminate Strength | Laminate Strength after storing 40° C., 90% humidity for 14 days |
| Comparative Example 29 | Excellent | 4.0 | 0.0 |
| Comparative Example 30 | Excellent | 3.0 | 0.0 |
| Comparative Example 31 | Excellent | 3.5 | 0.0 |
| Comparative Example 32 | Good | 1.9 | 0.0 |
| Comparative Example 33 | Excellent | 2.6 | 0.0 |
| Comparative Example 34 | Excellent | 4.0 | 0.0 |
| Comparative Example 35 | Excellent | 2.9 | 0.0 |
| Example 29 | Excellent | 4.1 | 3.7 |
| Example 30 | Excellent | 4.0 | 3.9 |
| Example 31 | Excellent | 4.2 | 4.0 |
| Example 32 | Good | 1.9 | 2.5 |
| Example 33 | Excellent | 3.2 | 3.0 |
| Example 34 | Excellent | 4.2 | 4.0 |
| Example 35 | Excellent | 3.0 | 3.2 |

TABLE 7

| Base film | Laminate Structure 3 Aluminum Foil | | |
|---|---|---|---|
| Evaluation Item | Adhesion of Adhesive | Laminate Strength | Laminate Strength after Retort Test using Vineger |
| Comparative Example 36 | Excellent | 3.5 | 0.0 |
| Comparative Example 37 | Excellent | 2.9 | 0.0 |
| Comparative Example 38 | Excellent | 3.2 | 0.0 |
| Comparative Example 39 | Good | 2.0 | 0.0 |
| Comparative Example 40 | Excellent | 2.9 | 0.0 |
| Comparative Example 41 | Excellent | 4.3 | 0.0 |
| Comparative Example 42 | Excellent | 3.1 | 0.0 |
| Example 36 | Excellent | 3.7 | 3.5 |
| Example 37 | Excellent | 3.5 | 3.9 |
| Example 38 | Excellent | 3.2 | 3.5 |
| Example 39 | Good | 2.5 | 2.5 |
| Example 40 | Excellent | 3.2 | 3.0 |
| Example 41 | Excellent | 4.0 | 4.0 |
| Example 42 | Excellent | 3.4 | 3.2 |

Preparation of Primer

Examples 8 to 14

The main component solution (A), of which the monomer composition is shown in Table 8, was prepared. The solvent used contains MEK, ethyl acetate, and propylene glycol monomethyl ether at 70:14:16 in volume. The content of nonvolatile components in the solvent was adjusted to 10% by volume.

In addition, the Example primers 8 to 14 were prepared by adding the curing agent (B) and the compound (C) having 2 or more of a carboxylic acid group or 1 or more of an anhydrous carboxylic acid group in the molecule in the main component solution (A) so as to have the composition shown in Table 8.

TABLE 8

| | Main component solution (A) | | | | | | Compound (C) | Curing agent (B) | |
|---|---|---|---|---|---|---|---|---|---|
| | MMA | AN | β-HEMA | St | BA | BMA | MAA | DFMCDA | XDI-TMP | IPDI-TMP |
| Example Primer 8 | 50 | 20 | 30 | 0.05 | 0.05 | — | — | Trimellitic anhydride: 5 | 50 | 50 |
| Example Primer 9 | 80 | — | 20 | 0.05 | 0.05 | — | — | Pyromellitic anhydride: 20 | 50 | 50 |
| Example Primer 10 | 10 | 30 | 30 | — | — | 30 | — | Maleic acid: 3 | 50 | 50 |
| Example Primer 11 | 60 | — | 20 | — | 20 | — | — | Malic acid: 1 | 50 | 50 |
| Example Primer 12 | — | 35 | 30 | — | — | 32 | 3 | Pyromellitic anhydride: 10 | 50 | 50 |
| Example Primer 13 | 10 | 30 | 30 | — | — | 30 | — | VMCH: 10 | 50 | 50 |
| Example Primer 14 | 10 | 30 | 30 | — | — | 30 | — | 353S: 10 | 50 | 50 |

Preparation of Lamination

Example 46 to 52

The Example laminate 46 to 52, which has the same structure as that of the laminate Structure 1, was produced by coating the Example Primer 8 to 14 containing the components (A), (B), and (C), of which the composition is shown in Table 8, on an alumina deposition layer of the deposit aluminum oxide PET film having a thickness of 12 μm ("BARRIALOX®-VM-PET1011(HG)" marketed by Toray Advanced Film Co., Ltd.) as the base film by a direct gravure method so that the coated amount after drying be 1.0 g/m².

The primer adhesion of the Example laminate 46 to 52 was evaluated. The results are shown in Table 9.

TABLE 9

| | Laminate Structure 1 Adhesion of the Primer to the Deposit Alumina PET |
|---|---|
| Example Laminate 46 | Excellent |
| Example Laminate 47 | Excellent |
| Example Laminate 48 | Excellent |
| Example Laminate 49 | Excellent |
| Example Laminate 50 | Excellent |
| Example Laminate 51 | Excellent |
| Example Laminate 52 | Excellent |

Preparation of Laminate

Examples 53 to 59

The laminate having the same structure as that of the laminate Structure 2 was produced by coating gravure ink (Univure A; 407 middle chrome yellow, 105 red, 507 primary indigo, 805 black (sumi), 793 white; marketed by DIC Corporation) on the surface of the primer, which had been dried and cured, in the laminate of the Example 46 to 52. Moreover, when printing, 3 parts of CVL curing agent #10 was added in 100 parts of Univure A, which is gravure ink marketed by DIC Corporation. Then, after coating the gravure ink, the obtained laminate was subjected to aging to be cured at 40° C. for 48 hours.

The adhesion, and transfer properties of ink, and ink reproducibility of the Example laminates 53 to 59 were evaluated.

TABLE 10

| Base film | Laminate Structure 2 Deposit Alumina PET | | |
|---|---|---|---|
| Evaluation Item | Ink Reproducibility | Ink Transfer Properties | Adhesion of Ink |
| Example Laminate 53 | Excellent | Excellent | Excellent |
| Example Laminate 54 | Good | Excellent | Excellent |
| Example Laminate 55 | Excellent | Excellent | Excellent |
| Example Laminate 56 | Good | Excellent | Excellent |
| Example Laminate 57 | Excellent | Excellent | Excellent |
| Example Laminate 58 | Excellent | Excellent | Excellent |
| Example Laminate 59 | Excellent | Excellent | Excellent |

Preparation of Laminate

Examples 60 to 66

The laminate having the same structure as that of the laminate Structure 3 was produced by adhering the unstretched PP film (ZK-93KM, marketed by Toray Advanced Film Co., Ltd.) to the print ink layer of the laminate in Examples 53 to 59 using an adhesive (DICDRY® LX-963, marketed by DIC Corporation) in Examples 60 to 66.

The adhesive adhesion, laminate strength, and laminate strength after the storing the laminate at 40° C. at 90% humidity for 14 days of the obtained laminates were evaluated. The results are shown in Table 11.

TABLE 11

| Base film | Laminate Structure 3 Deposit Alumina PET | | |
|---|---|---|---|
| Evaluation Item | Adhesion of Adhesive | Laminate Strength | Laminate Strength after storing 40° C., 90% humidity for 14 days |
| Example 60 | Excellent | 4.0 | 2.9 |
| Example 61 | Excellent | 4.1 | 3.8 |
| Example 62 | Excellent | 4.2 | 3.0 |
| Example 63 | Excellent | 4.0 | 1.2 |
| Example 64 | Excellent | 4.2 | 3.8 |
| Example 65 | Excellent | 4.2 | 3.8 |
| Example 66 | Excellent | 4.2 | 3.8 |

Adhesion, etc. of Primer To Various Base Films: Laminate Structure 1

The laminate in Examples 67 to 71, which has the same structure as that of the laminate Structure 1, was produced by coating the Example Primer 5 containing the components (A), (B), and (C), of which the composition is shown in Table 1, on a PET film having a thickness of 12 μm (E5100, marketed by TOYOBO Co., Ltd.), a deposit silica PET film having a thickness of 12 μm (GL-E, marketed by Toppan printing Co., Ltd.), a deposit aluminum oxide PET film having a thickness of 12 μm (IB-PET-PC, marketed by Dai Nippon Printing Co., Ltd.), a polyactic acid-based biodegradable film (TERRAMAC®TF, marketed by Unitika Ltd.), or a stretched PP film having a thickness of 30 μm (FOR, marketed by Futamura Chemical Co., Ltd.) as the base film by a direct gravure method so that the coated amount after drying was 1.0 g/m².

Similarly, the laminate in Example 72, which has the same structure as that of the laminate Structure 1, was produced in a manner identical to the manner explained above, except that a pure white print paper (Hamayu, marketed by Kishu Paper Co., Ltd.) was used as the base film, and the Example Primer 5 was coated so that the coated amount after drying was 3.0 g/m². The coated amount of the Example Primer 5 was adjusted by considering the penetration of ink into paper.

The adhesion of the primer in the Example laminates 67 to 72 was evaluated. The results are shown in Table 12.

TABLE 12

| | Laminate Structure 1 | |
| --- | --- | --- |
| | Base film | Adhesion of Primer to Base Film |
| Example Laminate 67 | GL-E, PET film having a thickness of 12 μm | Excellent |
| Example Laminate 68 | GL-E, Deposit Silica PET film having a thickness of 12 μm | Excellent |
| Example Laminate 69 | IB-PET-PC, Deposit Alumina PET film having a thickness of 12 μm | Excellent |
| Example Laminate 70 | TERRAMAC ® TF, Polyactic Acid-Based Biodegradable Film | Excellent |
| Example Laminate 71 | FOR, Stretched PP Film having a thickness of 30 μm | Excellent |
| Example Laminate 72 | Hamayu, Pure White Print Paper | Excellent |

Adhesion to Inorganic Deposit Coating Layer, and Hot Water Resistance of the Primer According to the Present Invention The laminate in Example 73 was produced by coating the Example Primer 5 shown in Table 1 on a PET film having a thickness of 12 μm (E5100, marketed by TOYOBO Co., Ltd.) by a reverse gravure method so that the coated amount after drying was 1.0 g/m².

Then, the laminate in Example 74 was produced by depositing aluminum oxide on the primer layer by the oxidation reaction deposition method such that the thickness was 50 nm.

In addition, the laminate in Example 75 was produced by coating the Example Primer 5 on the deposit layer by reverse gravure method again so that the coated amount after drying was 0.5 g/m².

In addition, the laminate in Example 76 was produced by printing gravure ink (Univure A; 407 middle chrome yellow, 105 red, 507 primary indigo, 805 black (sumi), 793 white; marketed by DIC Corporation) on the surface of the primer layer.

In addition, the laminate in Example 77 was produced by dry-laminating a unstretched PP film (ZK-93 KM, marketed by Toray Advanced Film Co., Ltd.) to the print ink layer using an adhesive (DICDRY® LX-963, marketed by DIC Corporation).

The items shown in Table 13 of the laminates obtained were evaluated. The results are shown in Table 13.

Moreover, "Laminate Strength*After Storing" means the laminate strength of the laminate after storing at 40° C. at 90% humidity for 14 days.

It is clear from Table 13 that the primer of the present invention has superior adhesion between the inorganic deposit coating and the urethane-based gravure ink. In addition, the primer of the present invention has excellent hot water resistance (121° C., for 30 minutes) and storing stability under highly humid conditions.

TABLE 13

| | Example Laminate 73 | Example Laminate 74 | Example Laminate 75 | Example Laminate 76 | Example Laminate 77 |
| --- | --- | --- | --- | --- | --- |
| Laminate Structure | 1 | 5 | 6 | 7 | 8 |
| Adhesion of Primer | Excellent | — | Excellent | — | — |
| Adhesion Properties of Deposit layer | — | Excellent | — | — | — |
| Ink Adhesion | — | — | — | Excellent | — |
| Ink Transfer Properties | — | — | — | Excellent | — |
| Ink Dot Reproducibility | — | — | — | Excellent | — |
| Adhesive adhesion | — | — | — | — | Excellent |
| Laminate Strength | — | — | — | — | 3.8 |
| Laminate Strength after retort | — | — | — | — | 3.9 |
| Laminate Strength After Storing* | — | — | — | — | 3.6 |

INDUSTRIAL APPLICABILITY

The primer according to the present invention can be used as a primer for a package which has improved adhesion between the base layer, a printing ink layer, a coating layer, and an adhesive layer, and thereby having print suitability, such as excellent transfer properties of printing ink and dot reproducibility, high adhesive properties, excellent storage stability for a long period of time under highly humid conditions, and acid resistance. Thereby, it is possible to print highly defined images having excellent design on a surface of various kinds of packages, which were not readily printed with high definition. The primer of the present invention can be used widely in packages.

| EXPLANATIONS OF SYMBOLS | |
|---|---|
| 1 | base |
| 2 | primer layer which is dried and cured |
| 3 | print ink layer |
| 4 | adhesive layer |
| 5 | film (sealant layer) |
| 6 | deposition layer |

The invention claimed is:

1. A primer for obtaining a laminate for packaging consisting essentially of:
   a main component (A) consisting essentially of a copolymer consisting essentially of, as a monomer, an unsaturated compound (a) having one hydroxyl group, at least one unsaturated compound (b) selected from the group consisting of unsaturated carboxylate, styrene, unsaturated carboxylic acid, unsaturated hydrocarbon, vinyl ester, and a halogenated vinyl compound, and an unsaturated nitrile (c);
   a curing agent (B) consisting essentially of a compound having an isocyanate group; and
   a compound (C) having 2 or more of a carboxylic acid group or 1 or more of an anhydrous carboxylic acid group, and having a number average molecular weight of 1,000 or less.

2. A primer according to claim 1, wherein the copolymer in the main component (A) contains, as a monomer, unsaturated nitrile (c), in addition to an unsaturated compound (a) having a hydroxyl group; and at least one unsaturated compound (b) selected from the group consisting of unsaturated carboxylate, styrene, unsaturated carboxylic acid, unsaturated hydrocarbon, vinyl ester, and a halogenated vinyl compound.

3. A primer according to claim 1, wherein the content of the compound (C) having 2 or more of a carboxylic acid group or 1 or more of an anhydrous carboxylic acid group in the primer is in a range from 0.5 to 50% by mass.

4. A primer for obtaining a laminate for packaging consisting essentially of:
   a main component (A) containing a copolymer containing, as a monomer, an unsaturated compound (a) having one hydroxyl group, and at least one unsaturated compound (b) selected from the group consisting of unsaturated carboxylate, styrene, unsaturated carboxylic acid, unsaturated hydrocarbon, vinyl ester, and a halogenated vinyl compound;
   a curing agent (B) containing a compound having an isocyanate group; and a tetrabasic acid anhydride.

5. A primer according to claim 2, wherein the unsaturated nitrile (c) in the main component (A) contains acrylonitrile, and the content of the acrylonitrile in the main component (A) is in a range from 10 to 50% by mass.

6. A primer according to claim 1, wherein the content of the unsaturated compound (a) having a hydroxyl group in the main component (A) is in a range from 10 to 70% by mass.

7. A primer according to claim 1, wherein the unsaturated compound (a) having a hydroxyl group in the main component (A) contains β-hydroxyethyl methacrylate, and the content of the β-hydroxyethyl methacrylate in the main component (A)—is in a range from 10 to 70% by mass.

8. A primer for obtaining a laminate for packaging consisting essentially of:
   a main component (A) containing a copolymer containing, as a monomer, an unsaturated compound (a) having one hydroxyl group, and at least one unsaturated compound (b) selected from the group consisting of unsaturated carboxylate, styrene, unsaturated carboxylic acid, unsaturated hydrocarbon, vinyl ester, and a halogenated vinyl compound;
   a curing agent (B) containing a compound having an isocyanate group; and
   a compound (C) having 2 or more of a carboxylic acid group or 1 or more of an anhydrous carboxylic acid group, and having a number average molecular weight of 1,000 or less,
   wherein the unsaturated compound (b) in the main component (A) contains methyl methacrylate as the unsaturated carboxylate, and the content of methyl methacrylate in the main component (A) is in a range from 20 to 55% by mass.

9. A primer for obtaining a laminate for packaging consisting essentially of:
   a main component (A) containing a copolymer containing, as a monomer, an unsaturated compound (a) having one hydroxyl group, and at least one unsaturated compound (b) selected from the group consisting of unsaturated carboxylate, styrene, unsaturated carboxylic acid, unsaturated hydrocarbon, vinyl ester, and a halogenated vinyl compound;
   a curing agent (B) containing a compound having an isocyanate group; and
   a compound (C) having 2 or more of a carboxylic acid group or 1 or more of an anhydrous carboxylic acid group, and having a number average molecular weight of 1,000 or less,
   wherein the unsaturated compound (b) in the main component (A) contains acrylic acid or methacrylic acid as the unsaturated carboxylic acid, and the content of acrylic acid or methacrylic acid in the main component (A) is in a range from 0.05 to 3% by mass.

10. A primer according to claim 1, wherein the unsaturated compound (b) in the main component (A) contains styrene, and the content of styrene in the main component (A) is in a range from 0.01 to 30% by mass.

11. A primer according to claim 1, wherein the unsaturated compound (b) in the main component (A) contains butyl acrylate or butyl methacrylate as the unsaturated carboxylate, and the content of butyl acrylate or butyl methacrylate in the main component (A) is in a range from 0.01 to 30% by mass.

12. A laminate for packaging containing a resin coating layer comprising the primer according to claim 1 on a base.

13. A laminate according to claim 12, wherein the base is at least one selected from the group consisting of a paper base, a metal base, and a plastic base.

14. A laminate according to claim 12, wherein the laminate includes at least one selected from the group consisting of an ink layer, an adhesive layer, and a sealant layer on the resin coating layer.

15. A laminate according to claim 12, wherein the laminate includes an ink layer, an adhesive layer, and a sealant layer, in this order, on the resin coating layer.

16. A laminate according to claim 12, wherein the laminate further includes another resin coating layer on the resin coating layer.

17. A laminate according to claim 12, wherein the laminate includes an inorganic thin film layer on the resin coating layer.

* * * * *